United States Patent
Fukuda

(10) Patent No.: US 11,607,627 B2
(45) Date of Patent: Mar. 21, 2023

(54) METHOD FOR PRODUCING A GAS

(71) Applicant: TAIYO NIPPON SANSO CORPORATION, Tokyo (JP)

(72) Inventor: Kenji Fukuda, Tsukuba (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 186 days.

(21) Appl. No.: 17/146,796

(22) Filed: Jan. 12, 2021

(65) Prior Publication Data

US 2021/0129045 A1 May 6, 2021

Related U.S. Application Data

(62) Division of application No. 16/322,657, filed as application No. PCT/JP2017/028425 on Aug. 4, 2017, now abandoned.

(30) Foreign Application Priority Data

Aug. 8, 2016 (JP) .................................. 2016-155681

(51) Int. Cl.
*B01D 19/00* (2006.01)
*C01B 6/10* (2006.01)

(52) U.S. Cl.
CPC ..... *B01D 19/0042* (2013.01); *B01D 19/0031* (2013.01); *C01B 6/10* (2013.01); *B01D 19/0063* (2013.01)

(58) Field of Classification Search
CPC ........ B01D 19/00; B01D 19/0042; C01B 6/10
See application file for complete search history.

(56) References Cited

U.S. PATENT DOCUMENTS

| | | |
|---|---|---|
| 2010/0322844 A1 | 12/2010 | Sanui et al. |
| 2015/0345707 A1 | 12/2015 | Landeck et al. |
| 2020/0101400 A1 | 4/2020 | Fukuda et al. |

FOREIGN PATENT DOCUMENTS

| | | |
|---|---|---|
| CN | 415397 | 5/2003 |
| CN | 1415397 | 5/2003 |

(Continued)

OTHER PUBLICATIONS

Josyula et al. (Improved procedures for the generation of diborane from sodium borohydride and boron trifluoride, 2000, Inorg. Chem., 39, 1795-1802). (Year: 2000).*

(Continued)

*Primary Examiner* — Youngsul Jeong
(74) *Attorney, Agent, or Firm* — Nixon & Vanderhye P.C.

(57) ABSTRACT

One object of the present invention is to provide a gas-liquid separating device which can efficiently recover a target gas from a mixture containing at least a gas and a liquid in a gas-liquid coexistence state, and the present invention provides a gas-liquid separating device which separates and recovers a gas and a liquid from a mixture containing the gas and the liquid in a gas-liquid coexistence state, wherein the gas-liquid separating device includes an airtight space in which the mixture containing the gas and the liquid in a gas-liquid coexistence state is supplied and the mixture is stored as a mixture separated into gas and liquid, a supply path for supplying the mixture containing the gas and the liquid in a gas-liquid coexistence state into the airtight space, a gas recovery path for discharging the gas in the airtight space to the outside of the airtight space, a first decompressor which is provided in the gas recovery path and recovers the gas from the airtight space, a liquid recovery path for discharging the liquid in the airtight space to the outside of the airtight space, and a second decompressor which is (Continued)

provided in the liquid recovery path and configured to recover the liquid from the airtight space.

7 Claims, 1 Drawing Sheet

(56) References Cited

FOREIGN PATENT DOCUMENTS

| | | | |
|---|---|---|---|
| CN | 101415803 | 4/2009 | |
| CN | 204237610 | 4/2015 | |
| JP | 3-93603 | 4/1991 | |
| JP | 6-247707 | 9/1994 | |
| JP | H06-247707 | 9/1994 | |
| JP | H06247707 | 9/1994 | |
| JP | 2003-175385 | 6/2003 | |
| JP | 2003175385 A * | 6/2003 | ............... C02F 1/20 |
| JP | 2009-297684 | 12/2009 | |
| JP | 2011-026187 | 2/2011 | |

OTHER PUBLICATIONS

JP-2003175385-A_English (Year: 2003).*

International Search Report for PCT/JP2017/028425 dated Sep. 5, 2017, 2 pages.

Office Action issued in JP Appln. No. 2018-533003 dated Nov. 12, 2019 (w/ machine translation), 10 pages.

Office Action issued in CN Appln. No. 201780044736.0 dated Aug. 20, 2020 (w/ translation), 20 pages.

Office Action issued in U.S. Appl. No. 16/322,657 dated May 1, 2020.

Office Action issued in U.S. Appl. No. 16/322,657 dated Aug. 13, 2020.

Advisory Action issued in U.S. Appl. No. 16/322,657 dated Nov. 18, 2020.

Advisory Action issued in U.S. Appl. No. 16/322,657 dated Dec. 15, 2020.

* cited by examiner

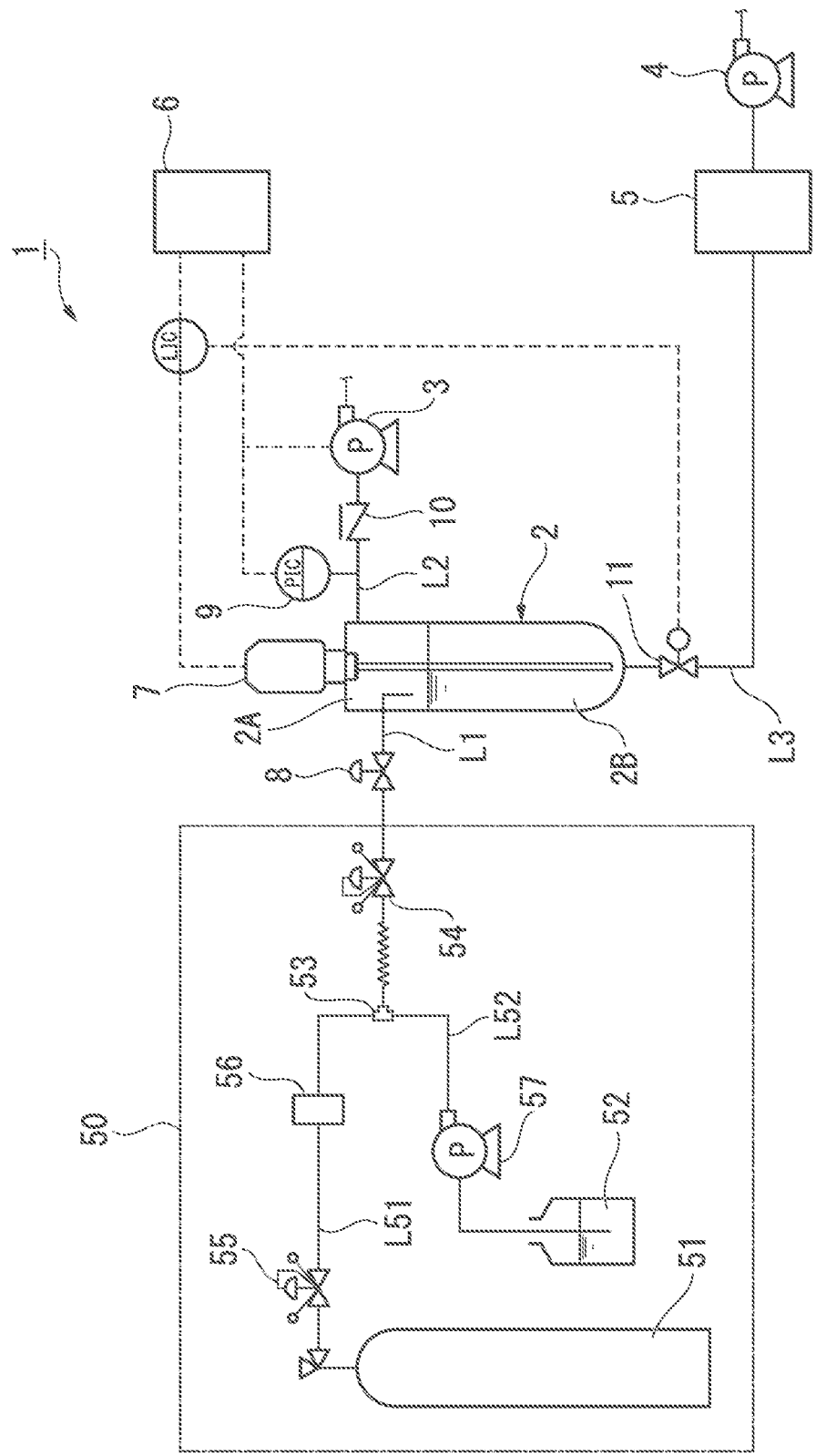

METHOD FOR PRODUCING A GAS

CROSS-REFERENCES TO RELATED APPLICATIONS

This application is a divisional of application Ser. No. 16/322,657 filed Feb. 1, 2019, which is a U.S. National Phase of International Application No. PCT/JP2017/028425 filed Aug. 4, 2017, which claims priority to JP Patent Application No. 2016-155681 filed Aug. 8, 2016, the entire contents of each of which are hereby incorporated by reference.

TECHNICAL FIELD

The present invention relates to a gas-liquid separating device.

BACKGROUND ART

A solvent may be used when generating a gas by a chemical reaction. For example, in a case of producing diborane gas, a method is known in which diborane gas is produced by adding a reducing agent into an organic solvent and blowing a raw material gas. A method is also known in which germane gas is produced by adding an acid solution into an aqueous solution containing a germanium compound and a reducing agent. A method is also known in which arsine gas is produced by reacting sulfuric acid with an arsenic raw material. A a method is also known in which nitric monoxide is produced by blowing sulfur dioxide into a nitric acid aqueous solution. Furthermore, a method is also known in which carbon monoxide is produced by reacting formic acid with sulfuric acid.

In addition, in the case of recovering a gas generated by a chemical reaction (hereinafter referred to as "product gas"), a method in which an inert gas such as nitrogen, argon, helium or the like or hydrogen gas is blown into a solvent to recover the product gas dissolved in the solvent has been used. For example, Patent Document 1 discloses a method in which diborane is produced by reacting sodium borohydride ($NaBH_4$) with boron trichloride ($BCl_3$) in the presence of a solvent. In the method, diborane is recovered by blowing helium into the reaction solution to recover the dissolved diborane.

PRIOR ART DOCUMENT

Patent Document

[Patent Document 1] Japanese Unexamined Patent Application, First Publication No. Hei 03-093603

SUMMARY OF INVENTION

Technical Problem

However, according to the conventional method disclosed in Patent Document 1, in the case of a gas which is easily dissolved in a solvent such as diborane, since a considerable amount of a target gas is contained in the solvent, even if a large amount of inert gas is blown, it is difficult to sufficiently recover, and the recovery efficiency is low. In addition, when the target gas cannot be sufficiently recovered from the solvent, the solvent contains a large amount of harmful gas, and there is a problem in that the processing of the solvent is difficult.

In addition, since a target gas is diluted with an inert gas, there is a problem in that a step of concentrating the diluted gas is necessary when a gas having a high concentration is required. In addition, since further costs are required for the inert gas productivity is less cost-efficient.

The present invention has been made in view of the above circumstances, and one object of the present invention is to provide a gas-liquid separating device which is capable of efficiently recovering a target gas from a mixture containing at least a gas and a liquid in a gas-liquid coexistence state.

Solution to Problem

In order to achieve the object, the present invention provides the following gas-liquid separating devices.
(1) A gas-liquid separating device which separates and recovers a gas and a liquid from a mixture containing the gas and the liquid in a gas-liquid coexistence state,
wherein the gas-liquid separating device includes:
an airtight space which is configured to be supplied with the mixture containing the gas and the liquid in a gas-liquid coexistence state and store the mixture as a mixture separated into gas and liquid;
a supply path which is configured to supply the mixture containing the gas and the liquid in a gas-liquid coexistence state into the airtight space;
a gas recovery path which is configured to discharge the gas in the airtight space to the outside of the airtight space;
a first decompressor which is provided in the gas recovery path and is configured to recover the gas from the airtight space;
a liquid recovery path which is configured to discharge the liquid in the airtight space to the outside of the airtight space; and
a second decompressor which is provided in the liquid recovery path and configured to recover the liquid from the airtight space.
(2) The gas-liquid separating device according to (1), wherein the gas-liquid separating device further includes a gas-liquid separator which is provided in the liquid recovery path and configured to separate the gas from the liquid and recover the liquid and the gas.
(3) The gas-liquid separating device according to (1) or (2), wherein the gas-liquid separating device further includes a liquid level detection device which is configured to detect the height of a liquid level in the airtight space, an on-off device provided in the liquid recovery path, and a control device which is connected to the liquid level detection device and the on-off device by an electric signal.
(4) The gas-liquid separating device according to any one of (1) to (3), wherein the gas is at least one selected from the group consisting of diborane gas, carbon dioxide, chlorine gas, germane gas, arsine gas, carbon monoxide, and nitric monoxide.

Effects of Present Invention

The gas-liquid separating device of the present invention has a simple structure and recovers a target gas from a mixture containing a gas and a liquid in a coexistence state with high efficiency without using an inert gas or the like.

BRIEF DESCRIPTION OF DRAWINGS

The FIGURE is a system diagram schematically showing an example of a gas-liquid separating device according to an embodiment of the present invention.

DESCRIPTION OF EMBODIMENTS

Hereinafter, the configuration of the gas-liquid separating device of an embodiment according to the present invention will be described in detail together with an operating method thereof. In the drawings used in the following description, for the sake of easy understanding of the features, there are cases where characteristic portions are shown enlarged for convenience, and the dimensional ratio of each component is not always the same as the actual device.

First, the configuration of a gas-liquid separating device of an embodiment according to the present invention will be described. The FIG. 1s a system diagram schematically showing an example of a gas-liquid separating device according to an embodiment of the present invention.

As shown in the FIGURE, the gas-liquid separating device 1 of the present embodiment includes a first gas-liquid separator (airtight space) 2, a supply path L1 which communicates with the inside of the first gas-liquid separator 2, a gas recovery path L2, a liquid recovery path L3, a first decompressor 3, a second decompressor 4, a second gas-liquid separator (gas-liquid separator) 5, and a control device 6. The gas-liquid separating device 1 separates a gas and a liquid from a mixture containing at least the gas and the liquid in a gas-liquid coexistence state, and recovers each of them.

The first gas-liquid separator (airtight space) 2 is a vessel which can separate a mixture containing a gas and a liquid in a gas-liquid coexistence state into the gas and the liquid and store them in an airtight space provided inside thereof. The airtight space in the first gas-liquid separator 2 is divided into a gas phase 2A and a liquid phase 2B.

Here, as the first gas-liquid separator 2, there is no particular limitation as long as it can separate a mixture containing a gas and a liquid in a gas-liquid coexistence state into the gas and the liquid and store them in an airtight space provided inside thereof. The first gas-liquid separator 2 is not limited to a vessel. Specifically, for example, a part of a pipe connecting the supply path L1 and the liquid recovery path L3 may have a larger diameter than a diameter of at least the supply path L1 to provide an airtight space. With such a configuration, it is possible to separate the mixture containing a gas and a liquid in a gas-liquid coexistence state into the gas and the liquid, and to store them in an airtight space provided inside of the pipe.

In order to detect the height of the interface (that is, the liquid level) between the gas phase 2A and the liquid phase 2B in the space inside the first gas-liquid separator 2, a liquid level gauge (liquid level detection device) 7 is provided in the first gas-liquid separator 2. Here, as the liquid level gauge 7, there is no particular limitation as long as it can detect the height of the liquid level in the first gas-liquid separator 2. Specifically, for example, a liquid level gauge such as a float type liquid level gage, a reflection type liquid level gage, a tube type liquid level gage, or a fluoroscopic type liquid level gage can be used.

The supply path L1 is a pipe which is provided between the first gas-liquid separator 2 and a supply unit of the mixture (hereinafter sometimes simply referred to as "supply unit") to supply the mixture containing a gas and a liquid in a gas-liquid coexistence state. An on-off valve 8 is provided with the supply path L1. Supply of the mixture from the supply unit 50 to the first gas-liquid separator 2 can be started by opening the on-off valve 8. On the other hand, supply of the mixture from the supply unit 50 to the first gas-liquid separator 2 can be stopped by closing the on-off valve 8.

The material of the piping constituting the supply path L1 is not particularly limited as long as it is not corroded by the gas and the liquid, and can be appropriately selected according to the composition of the mixture. Specifically, for example, pipes made of resin such as vinyl chloride resin and pipes made of metal such as SUS can be used.

The diameter of the pipe constituting the supply path L1 is not particularly limited, and it can be appropriately selected according to the supply amount of the mixture to the first gas-liquid separator 2. Specifically, for example, a pipe having an outer diameter of 1 to 30 (mm) can be used.

The configuration of the supply unit 50 is not particularly limited as long as it can supply the mixture containing a gas and a liquid in a gas-liquid coexistence state to the first gas-liquid separator 2 via the supply path L1. Therefore, in the gas-liquid separating device 1 of the present embodiment, the configuration of the supply unit 50 will be described by taking a case in which the gas is diborane gas as an example.

Specifically, as shown in the FIGURE, the supply unit 50 mainly includes a supply source 51 of a raw material of a gas (a boron trihalide gas such as $BF_3$ or $BCl_3$), a supply source 52 of a raw material of a liquid (ether-based solvent such as tetrahydrofuran, ethylene glycol dimethyl ether, diethylene glycol dimethyl ether, triethylene glycol dimethyl ether, etc. which contains a reducing agent), a raw material gas supply path L51, a raw material liquid supply path L52, a mixer 53 which is provided at a junction of the two supply paths L51 and L52, and connected to the supply path L1, and a back pressure valve 54 which is provided in the supply path L1 between the mixer 53 and the on-off valve 8. Further, a pressure regulating valve 55 and a mass flow controller 56 are provided from the primary side (upstream side) in the raw material gas supply path L51. Further, a liquid feed pump 57 is provided in the raw material liquid supply path L52. That is, the supply unit 50 is a device for generating diborane gas in the gas-liquid separating device 1 of the present embodiment.

According to the supply unit 50 having such a configuration, the mixture containing the diborane gas and the solvent in a gas-liquid coexistence state can be continuously supplied to the first gas-liquid separator 2 via the back pressure valve 54 provided in the supply path L1 by supplying the raw material of the gas and the raw material of the liquid into the mixer 53 and mixing them.

In a case in which the mixture is continuously supplied to the first gas-liquid separator 2, it is possible to supply the mixture at a stable flow rate by providing the back pressure valve 54 on the primary side (upstream side) of the first gas-liquid separator 2. Further, while maintaining the reduced pressure state of the first gas-liquid separator 2, the mixture can be continuously supplied to the first gas-liquid separator 2.

The gas recovery path L2 is a pipe which is provided so as to communicate with the gas phase 2A of the first gas-liquid separator 2 in order to discharge and supply the gas in the first gas-liquid separator 2 to the outside of the first gas-liquid separator 2. A pressure controller 9, a check valve 10, and a first decompressor 3 are provided in this order from the primary side (upstream side) in the gas recovery path L2.

The material of the pipe constituting the gas recovery path L2 is not particularly limited, and the same material as the supply path L1 can be used. The diameter of the pipe constituting the gas recovery path L2 is not particularly limited, and a pipe having the same diameter as that of the supply path L1 can be used.

The first decompressor 3 is provided in the gas recovery path L2 in order to aspirate and recover the gas (diborane gas) from the gas phase 2A in the first gas-liquid separator 2. According to the gas-liquid separating device 1 of the present embodiment, the pressure of the gas phase 2A of the first gas-liquid separator 2 is adjusted to be equal to or lower than the atmospheric pressure, for example, decompression conditions such as about 50 to 500 hPa are used by operating and controlling the first decompressor 3 and the pressure controller 9. Then, the gas (diborane gas) can be recovered from the secondary side of the first decompressor 3.

The capacity of the first decompressor 3 is not particularly limited as long as it can reduce the pressure of the gas phase 2A in the first gas-liquid separator 2 to a required pressure (for example, about 50 to 500 hPa). The capacity of the first decompressor 3 can be appropriately selected according to the components of the mixture supplied into the first gas-liquid separator 2. Specifically, as the first decompressor 3, a commercially available vacuum/decompressor pump (for example, "BA-106F" manufactured by IWAKI Co., Ltd., etc.) can be used.

It should be noted that a purifier or the like for purifying the recovered gas may be provided on the secondary side of the first decompressor 3 in the gas recovery path L2. Further, a reaction device or the like in the subsequent stage may be provided on the secondary side of the first decompressor 3 in the gas recovery path L2.

The liquid recovery path L3 is a pipe which is provided so as to communicate with the liquid phase 2B of the first gas-liquid separator 2 in order to discharge and supply the liquid in the first gas-liquid separator 2 to the outside of the first gas-liquid separator 2. Further, an on-off valve (opening/closing device) 11, a second gas-liquid separator (gas-liquid separator) 5 and a second decompressor 4 are provided in this order from the primary side (upstream side) in the liquid recovery path L3.

The material of the piping constituting the liquid recovery path L3 is not particularly limited, and the same material as the supply path L1 or the gas recovery path L2 can be used. The diameter of the pipe constituting the liquid recovery path L3 is not particularly limited, and a pipe having the same diameter as that of the supply path L1 or the gas recovery path L2 can be used.

The second decompressor 4 is provided in the liquid recovery path L3 in order to aspirate and recover the liquid (ether solvent) from the liquid phase 2B in the first gas-liquid separator 2. According to the gas-liquid separating device 1 of the present embodiment, since the pressure in the first gas-liquid separator 2 is reduced, the liquid can be recovered from the liquid phase 2B by operating the second decompressor 4 to reduce the pressure.

The capacity of the second decompressor 4 is not particularly limited as long as it can reduce the pressure to equal to or higher than the pressure (the pressure of the gas phase 2A) in the first gas-liquid separator 2. The capacity of the second decompressor 4 can be appropriately selected according to the capacity of the first decompressor 3. Specifically, as the second decompressor 4, a commercially available vacuum pump (for example, "V-710" manufactured by Shibata Science Co., Ltd., etc.) can be used as in the first decompressor 3. Further, the second decompressor 4 may be the same as or different from that of the first decompressor 3. Thus, it is possible to recover the liquid (ether solvent) from the secondary side of the second decompressor 4.

The on-off valve 11 is provided on the primary side (upstream side) of the second decompressor 4 in the liquid recovery path L3. It is possible to start discharging the liquid from the inside of the first gas-liquid separator 2 to the liquid recovery path L3 by opening the on-off valve 11. On the other hand, the discharge of the liquid from the first gas-liquid separator 2 into the liquid recovery path L3 can be stopped by closing the on-off valve 11.

The second gas-liquid separator 5 is provided in the liquid recovery path L3 on the primary side (upstream side) of the second decompressor 4 in order to separate and recover the gas dissolved in the liquid discharged from the first gas-liquid separator 2 into the liquid recovery path L3. According to the gas-liquid separating device 1 of the present embodiment, since the gas dissolved in the liquid discharged from the first gas-liquid separator 2 can be recovered by providing the second gas-liquid separator 5, the target gas can be recovered with high efficiency. At the same time, the liquid discharged from the first gas-liquid separator 2 into the liquid recovery path L3 can be purified.

The second gas-liquid separator 5 is not particularly limited as long as it can separate a gas dissolved in the liquid from a liquid. Specifically, as the second gas-liquid separator 5, for example, a rotary evaporator, a solvent recovery device capable of condensing a solvent, or the like can be used.

The control device 6 includes a controller which drives each driving unit and a control unit which controls each controller, as an operation control system. Each controller is, for example, a PID controller or the like. Each controller is electrically connected to an actuator provided in the liquid level gauge 7, the on-off valve 8, the pressure controller 9, the on-off valve 11, the first decompressor 3, the second decompressor 4, and the like. Each controller performs startup, stop, adjustment, and the like of the parts.

Next, an example of the operation method of the gas-liquid separating device 1 of the embodiment above will be described.

First, a mixture containing diborane gas (gas) and ether solvent (liquid) in a gas-liquid coexistence state is continuously generated in the supply unit 50.

Specifically, a raw material of the gas is supplied from the raw material gas supply source 51 to the mixer 53 while adjusting the flow rate by the mass flow controller 56 via the raw material gas supply path L51. Likewise, an ether-based solvent containing a reducing agent is supplied from the raw material liquid supply source 52 to the mixer 53 while adjusting the flow rate by the liquid feed pump 57 via the raw material liquid supply path L52. As the raw material of the gas, boron trihalide gas such as $BF_3$ or $BCl_3$ gas can be used. As the reducing agent, alkali metal hydrides such as $NaH$, $LiAlH_4$, and $NaBH_4$ can be used. As the ether solvent, tetrahydrofuran, ethylene glycol dimethyl ether, diethylene glycol dimethyl ether, triethylene glycol dimethyl ether and the like can be used.

Here, the supply condition of the raw material of the gas is not particularly limited, and it can be appropriately selected according to various factors. Specifically, for example, the pressure is 0.01 to 9 MPaG, preferably 0.1 to 5 MPaG, and more preferably 0.1 to 0.9 MPaG. The flow rate is 10 to 5,000 mL/min, and preferably 100 to 1,000 mL/min.

Likewise, the supply condition of the raw material of the liquid is not particularly limited, and it can be appropriately selected according to various factors. Specifically, for example, the flow rate is 30 to 5,000 mL/min, and preferably 50 to 300 mL/min. The concentration of the reducing agent is 0.01 to 5 mol/L, and preferably 0.05 to 1 mol/L.

In the mixer 53, the raw material of the gas and the raw material of the liquid react to continuously produce a mixture containing diborane gas (gas) and the ether solvent (liquid) in a gas-liquid coexistence state. The generated mixture is supplied into the first gas-liquid separator 2 via the back pressure valve 54 and the on-off valve 8 provided in the supply path 1 at a stable flow rate while maintaining the reduced pressure state.

Next, the inside of the first gas-liquid separator 2 is depressurized to the atmospheric pressure (absolute pressure) or lower, for example, 50 to 500 hPa absolute by the first decompressor 3 provided in the gas recovery path L2 which communicates with the gas phase 2A. It is to be noted that this reduced pressure state is controlled to be kept constant by the first decompressor 3 and the pressure controller 9.

The mixture supplied into the first gas-liquid separator 2 is separated into diborane gas (gas) and ether solvent (liquid), and the gas phase 2A and the liquid phase 2B are each produced in the first gas-liquid separator 2.

The diborane gas (gas) in the first gas-liquid separator 2 is recovered from the secondary side of the first decompressor 3. It should be noted that the recovered diborane gas may be recovered after being purified with a purifier or the like provided in a subsequent stage, or may be supplied to a reaction device or the like provided in a subsequent stage.

Meanwhile, as the mixture is continuously supplied into the first gas-liquid separator 2 and diborane gas (gas) is recovered, the liquid phase 2B in the first gas-liquid separator 2 increases and the liquid level rises.

When the position of the liquid level reaches a predetermined set value input to the liquid level sensor 7, the signal value is sent to the control device 6, and an operation signal is sent from the control device 6 to the second decompressor 4. Subsequently, the second decompressor 4 starts the operation such that the pressure of the liquid recovery path L3 becomes lower than the pressure in the first gas-liquid separator 2.

When the pressure value in the liquid recovery path L3 becomes lower than the pressure value in the first gas-liquid separator 2, an open signal is sent from the control device 6 to the on-off valve 11. The on-off valve 11 which receives the signal is opened, and the ether solvent (liquid) in the first gas-liquid separator 2 is discharged into the liquid recovery path L3.

Since the interior of the first gas-liquid separator 2 is in a depressurized state as described above, if the on-off valve 11 is open as it is, air is introduced into the first gas-liquid separator 2 via the liquid recovery path L3, and the liquid cannot be recovered. According to the gas-liquid separating device 1 of the present embodiment, since the second decompressor 4 is provided and the liquid recovery path L3 can be brought into a lower pressure state than the inside of the first gas-liquid separator 2, the liquid in the first gas-liquid separator 2 can be discharged.

Next, when the liquid phase 2B in the first gas-liquid separator 2 decreases, the liquid level descends. When the liquid level reaches a predetermined set value input to the liquid level sensor 7, the signal value is sent to the control device 6, and a close signal is sent from the control device 6 to the on-off valve 11. The on-off valve 11 receiving the signal is closed, and the discharge of the ether solvent (liquid) in the first gas-liquid separator 2 into the liquid recovery path L3 is stopped.

The ether solvent (liquid) discharged from the first gas-liquid separator 2 is introduced into the second gas-liquid separator 5 provided in the liquid recovery path L3. In this second gas-liquid separator 5, diborane gas (gas) dissolved in the ether solvent (liquid) can be separated and recovered. As a result, it is possible to efficiently recover the target diborane gas (gas), and to purify and reuse the ether solvent (liquid). A solid mixed in the ether solvent (liquid) is separated from the solvent and discarded as a dried solid.

As described above, according to the gas-liquid separating device 1 of the present embodiment, it is possible to remove the target diborane gas (gas) with high efficiency from the mixture containing the diborane gas (gas) and the ether solvent (liquid) in a gas-liquid coexistent state.

Further, since there is no need to use an inert gas or the like, high concentration diborane gas (gas) can be recovered without adding a step of concentrating the target diborane gas (gas). In addition, the gas-liquid separating device 1 of the present embodiment does not cause an increase in the cost of inert gas and the like. Accordingly, the gas-liquid separating device 1 of the present embodiment is economical and the productivity can be enhanced.

Further, according to the gas-liquid separating device 1 of the present embodiment, since the second gas-liquid separator 5 is provided in the liquid recovery path L3, the diborane gas (gas) dissolved in the recovered ether solvent (liquid) can be separated and recovered. In this way, the target diborane gas (gas) can be recovered with higher efficiency by using the first gas-liquid separator 2 and the second gas-liquid separator 5 in combination.

In addition, since the amount of the residual diborane gas (gas) in the ether solvent (liquid) can be reduced by the second gas-liquid separator 5, even when the target gas is a toxic gas, solution treatment and reuse can be easily performed.

Further, according to the gas-liquid separating device 1 of the present embodiment, since the production and supply of the mixture, and the recovery of the gas and the liquid from the first gas-liquid separator 2 can be performed continuously, the productivity per hour can be improved.

Further, since the control device 6 can automatically operate, erroneous work of the operator can be prevented.

It should be noted that the technical scope of the present invention is not limited to the above embodiments, and various modifications can be made without departing from the spirit of the present invention.

For example, according to the gas-liquid separating device 1 of the above-described embodiment, the mixture supply section 50 includes the raw material gas supply source 51, the raw material liquid supply source 52, and the mixer (mixer) 53, and diborane gas is produced as an example. However, the present invention is not limited thereto. That is, the mixture supply unit 50 may have any configuration as long as it includes one or more supply sources of raw materials (including solvents, catalysts and the like) in a solid state, a liquid state or a gaseous state, and can supply a mixture containing a gas and a liquid in a gas-liquid coexistence state.

Specifically, for example, the mixture supply unit 50 may have a configuration in which a mixture containing hydrogen (gas) and an ether solvent (liquid) in a gas-liquid coexistence state is produced (manufactured) by using an acid such as acetic acid, and hydrochloric acid, and a hydrogenated metal such as NaH and $NaBH_4$ as a raw material. Further, the mixture supply unit 50 may have a configuration in which gases which are easily dissolved in a solvent (liquid) used for the reaction, such as carbon dioxide, chlorine gas, germane, arsine, nitric monoxide and carbon monoxide are produced. In particular, germane, arsine and nitric monoxide are difficult to recover sufficiently even if a large amount of inert gas is blown, and furthermore they are toxic. Therefore, when these gases cannot be sufficiently recovered from the solvent, it becomes difficult to process the solvent. Therefore, it is preferable that the gas-liquid separating device 1 include the mixture supply unit 50 having a configuration in which these gases are produced.

For example, the mixture supply unit 50 may have a configuration in which a mixture containing carbon dioxide (gas) and water (liquid) in a gas-liquid coexistence state is produced (manufactured) using calcium carbonate and hydrochloric acid as a raw material.

Alternatively, the mixture supply unit 50 may have a configuration in which a mixture containing chlorine gas (gas) and water (liquid) in a gas-liquid coexistence state is produced (manufactured) using perchloric acid and hydrochloric acid as a raw material.

In addition, the mixture supply unit 50 may have a configuration in which a mixture containing germane (gas) and an aqueous solution (liquid) in a gas-liquid coexistence state is produced (manufactured) by reacting an alkali metal borohydride aqueous solution (liquid) with sodium germanate as a raw material.

Furthermore, the mixture supply unit 50 may have a configuration in which a mixture containing germane (gas) and an aqueous solution (liquid) in a gas-liquid coexistence state is produced (manufactured) by reacting a mixture containing a germanium dioxide solution and an alkali metal borohydride aqueous solution (liquid) with an acid aqueous solution (liquid) as a raw material.

In addition, the mixture supply unit 50 may have a configuration in which a mixture containing arsine (gas) and an aqueous solution (liquid) in a gas-liquid coexistence state is produced (manufacture) by reacting metal arsenide (Ca, Zn, or the like) with sulfuric acid solution (2 to 80%).

Further, the mixture supply unit 50 may have a configuration in which a mixture containing nitric monoxide (gas) and an aqueous solution (liquid) in a gas-liquid coexistence state is produced (manufactured) by reacting an aqueous acid solution such as a nitric acid aqueous solution and a sulfuric acid aqueous solution (2 to 100%) with sulfur dioxide.

Further, the mixture supply unit 50 may have a configuration in which a mixture containing carbon monoxide (gas) and an aqueous solution (liquid) in a gas-liquid coexistence state is produced (manufactured) by reacting formic acid and a sulfuric acid aqueous solution (2 to 100%).

Further, according to the gas-liquid separating device 1 of the above-described embodiment, in order to separate and recover the gas dissolved in the liquid discharged from the first gas-liquid separator 2 into the liquid recovery path L3, the second liquid separator 5 is provided on the primary side (upstream side) of the second decompressor 4 in the liquid recovery path L3. However, the present invention is not limited thereto. Specifically, for example, in order to temporarily store the liquid discharged from the first gas-liquid separator 2 into the liquid recovery path L3, instead of the second gas-liquid separator 5, a buffer tank (a storage container) may be provided. Further, a buffer tank may be provided together with the second gas-liquid separator 5 on the primary side (upstream side) of the second decompressor 4 in the liquid recovery path L3.

Further, the gas-liquid separating device 1 of the above-described embodiment has a configuration in which the production and the supply of the mixture and the recovery of the gas and the liquid from the first gas-liquid separator 2 are performed consecutively. However, the present invention is not limited thereto. Specifically, for example, at least part or all of the supply of the mixture, the recovery of the gas, and the recovery of the liquid may be carried out in batch mode.

Further, according to the gas-liquid separating device 1 of the above-described embodiment, the control device 6 is provided to automatically operate. However, the present invention is not limited thereto. Specifically, for example, the operator may manually operate the gas-liquid separating device 1 without providing the control device 6.

Hereinafter, the effects of the present invention will be described in detail using examples and comparative examples. However, the present invention is not limited to the contents of the following example.

Example

Diborane was produced using the gas-liquid separating device 1 shown in the FIGURE. Specifically, $BF_3$ was fed as a raw material of diborane gas to the mixer 53 at a pressure of 0.3 MPaG and a flow rate of 100 to 300 mL/min. Further, an ether solvent in which 0.1 to 5 mol/L of a reducing agent ($NaBH_4$) was dissolved was fed to the mixer 53 at a flow rate of 50 to 300 mL/min by using the liquid feed pump 57.

The gas phase 2A of the first gas-liquid separator 2 was depressurized by the vacuum pump (first decompressor 3), and diborane gas as a target gas was recovered. The pressure inside the first gas-liquid separator 2 was maintained at about 200 hPa.

In addition, the rotary evaporator (second gas-liquid separator 5) as a solvent refining device was depressurized by the vacuum pump (second decompressor 4) and the pressure was maintained at about 200 Pa. Moreover, the liquid level of the reaction solution in the first gas-liquid separator 2 was monitored by the liquid level gauge 7 and the control device 6. When the liquid level reached the upper limit contact point, the air operated valve (the on-off valve 11) was opened. Then, when the liquid level reached the lower limit contact point, the air operation valve (the on-off valve 11) was closed.

As described above, the purity of diborane in the recovered gas was high, 99% by volume. In addition, when the solvent recovered by the rotary evaporator was analyzed by FT-IR, no residual $BF_3$ gas was confirmed. Further, it was possible to produce diborane at 10 g/h to 500 g/h. In addition, the amount of residual diborane contained in the solvent was about 1% by volume, which could be reduced to about 1/5 as compared with the comparative example described later.

Further, even in the rotary evaporator to which the solvent was fed, since the pressure rise due to the generated gas was suppressed, the operation could be performed at a constant pressure, and the solvent could be efficiently recovered.

Comparative Example

In the gas-liquid separating device 1 shown in the FIGURE, instead of the first decompressor 3 of the first gas-liquid separator 2, nitrogen gas was bubbled as an inert gas to recover diborane.

Since the diborane was mixed with the gas for expelling the diborane as the target gas, the purity of the obtained diborane was 5% by volume, and large-scale purification equipment was required for high purity diborane. Further, the residual amount of diborane in the reaction solution was about 5% by volume.

DESCRIPTION OF THE REFERENCE SIGNS 1 gas-liquid separating device
2 first gas-liquid separator (airtight space)

2A gas phase
2B liquid phase
3 first decompressor
4 second compressor
5 second gas-liquid separator (gas-liquid separator)
6 control device
7 liquid level gauge (liquid level detection device)
8 on-off valve
9 pressure controller
10 check valve
11 on-off valve (opening/closing device)
50 supply unit (supply part) of mixture
51 raw material gas supply source
52 raw material liquid supply source
53 mixer
54 back pressure valve
55 pressure regulating valve
56 mass flow controller
57 liquid feed pump
L1 supply path
L2 gas recovery path
L 3 liquid recovery path

What is claimed is:

1. A process for producing a gas, comprising:
a mixture production step in which a mixture in a gas-liquid coexistence state is produced by supplying each of a raw material of a gas and a raw material of a liquid into a mixer;
a supply step in which the mixture in a gas-liquid coexistence state is supplied into a gas-liquid separating device;
a gas recovery step in which the gas is recovered from the mixture in a gas-liquid coexistence state by reducing a pressure in the gas-liquid separating device to equal to or lower than atmospheric pressure (absolute pressure),
wherein the gas is diborane and the liquid is an ether-based solvent.

2. The method for producing a gas according to claim 1, wherein the mixture production step, the supply step, and the gas recovery step are successively carried out.

3. The method for producing a gas according to claim 1, wherein a pressure of the raw material of the gas supplied into the mixer is 0.1 to 5 MPaG in the mixture production step.

4. The method for producing a gas according to claim 1, wherein a pressure of the gas phase in the gas-liquid separating device is adjusted in a range from 50 to 500 hPa absolute.

5. The method for producing a gas according to claim 1, wherein the method further comprises a separating and recovering step in which gas dissolved in liquid discharged from the gas-liquid separating device is separated and recovered by a second gas-liquid separating device.

6. The method for producing a gas according to claim 1, wherein, in the gas recovery step, the mixture in the gas-liquid separating device is in a gas-liquid-solid coexistence state.

7. The method for producing a gas according to claim 4, wherein, in the gas recovery step, the mixture in the gas-liquid separating device is in a gas-liquid-solid coexistence state.

* * * * *